United States Patent
Jang

(10) Patent No.: US 11,158,877 B2
(45) Date of Patent: Oct. 26, 2021

(54) FUEL CELL STACK WITH DUMMY CELL AND HEATER THAT AID COLD START

(71) Applicants: Hyundai Motor Company, Seoul (KR); Kia Motors Corporation, Seoul (KR)

(72) Inventor: In Woo Jang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 146 days.

(21) Appl. No.: 16/655,559

(22) Filed: Oct. 17, 2019

(65) Prior Publication Data

US 2020/0373604 A1 Nov. 26, 2020

(30) Foreign Application Priority Data

May 22, 2019 (KR) .................. 10-2019-0060071

(51) Int. Cl.
| | | |
|---|---|---|
| *H01M 8/04291* | (2016.01) | |
| *H01M 8/24* | (2016.01) | |
| *H01M 8/2465* | (2016.01) | |
| *H01M 8/1004* | (2016.01) | |
| *H01M 8/04223* | (2016.01) | |
| *H01M 8/04007* | (2016.01) | |

(52) U.S. Cl.
CPC ..... *H01M 8/2459* (2016.02); *H01M 8/04007* (2013.01); *H01M 8/04268* (2013.01); *H01M 8/1004* (2013.01); *H01M 8/2465* (2013.01)

(58) Field of Classification Search
None
See application file for complete search history.

(56) References Cited

U.S. PATENT DOCUMENTS

| | | | |
|---|---|---|---|
| 7,799,480 B2 | 9/2010 | Nishiyama et al. | |
| 2017/0352900 A1* | 12/2017 | Kim ................. | H01M 8/04037 |

FOREIGN PATENT DOCUMENTS

| | | | |
|---|---|---|---|
| JP | 2006-147502 A | | 6/2006 |
| JP | 2013084486 A | * | 5/2013 |
| KR | 20140076048 A | * | 6/2014 |

OTHER PUBLICATIONS

English translation of KR2014/0076048A (Year: 2014).*
English translation of JP2013084486A (Year: 2013).*

* cited by examiner

*Primary Examiner* — Lucas J. O'Donnell
(74) *Attorney, Agent, or Firm* — Mintz Levin Cohn Ferris Glovsky and Popeo, P.C.; Peter F. Corless

(57) ABSTRACT

A fuel cell stack includes a power generation cell having a first gas diffusion layer and a dummy cell disposed at an end of the power generation cell and having a second gas diffusion layer with higher thermal conductivity than the first gas diffusion layer. An end plate is fastened at an end of the dummy cell and a heater is interposed between the dummy cell and the end plate.

12 Claims, 9 Drawing Sheets

FUEL CELL STACK WITH DUMMY CELL AND HEATER THAT AID COLD START

CROSS-REFERENCE TO RELATED APPLICATIONS

This application claims the priority benefit of Korean Patent Application No. 10-2019-0060071, filed on May 22, 2019, the disclosure of which is incorporated herein by reference.

BACKGROUND

Field of the Disclosure

The present disclosure relates to a fuel cell stack, and more particularly, to a fuel cell stack that minimizes a difference in temperature increase rate between a power generation cell and a dummy cell and improves operational efficiency.

Description of the Related Art

A fuel cell system refers to a system that continuously produces electrical energy by a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like. Among the fuel cells, the polymer electrolyte membrane fuel cell is applied to a hydrogen vehicle (e.g., hydrogen fuel cell vehicle) being developed to substitute for an internal combustion engine.

The hydrogen vehicle is configured to produce electricity by a chemical reaction between hydrogen and oxygen and to travel by operating a motor. Therefore, the hydrogen vehicle includes a hydrogen tank ($H_2$ Tank) configured to store hydrogen ($H_2$), a fuel cell stack (FC STACK) configured to produce electricity by an oxidation-reduction reaction between hydrogen and oxygen ($O_2$), various types of devices configured to discharge produced water, a battery configured to store electricity produced by the stack, a controller configured to convert and adjust the produced electricity, and a motor configured to generate driving power.

The fuel cell stack refers to a fuel cell main body in which several tens or hundreds of cells are stacked in series. In general, the fuel cell stack includes power generation cells having central cells and end cells disposed at outer sides of the central cells, and dummy cells disposed at outer sides of the power generation cells. The power generation cells and the dummy cells are fastened by the end plates coupled at outer sides of the dummy cells. The power generation cells are provided to generate power, and the dummy cells are non-power generation cells that do not generate power and are provided to improve performance in discharging water (e.g., condensate water) from the fuel cell stack.

Meanwhile, cold startability deteriorates when there is a difference in temperature increase rate between the central cell and the end cell proximate to outside air (e.g., close to the end plate) at the time of a cold start of the fuel cell stack. Therefore, the temperature increase rate at the end cell and the temperature increase rate at the central cell need to maximally coincide with each other. Accordingly, in the related art, a heater is disposed between the end plate and the end cell to heat the end cell by the heater at the time of the cold start.

However, in the related art, even though the heater operates at the time of the cold start, the temperature increase rate at the end cell is less than the temperature increase rate at the central cell since the dummy cell is disposed between the heater and the end cell. As a result, the cold start time for the fuel cell stack is increased. Therefore, recently, various types of research have been conducted to minimize the deterioration in temperature increase rate at the end cell and improve cold startability, but the research result is still insufficient. Accordingly, there is a need for development of the fuel cell stack capable of minimizing the deterioration in temperature increase rate at the end cell and improving cold startability.

SUMMARY

An object of the present disclosure is to provide a fuel cell stack capable of minimizing a difference in temperature increase rate between a central cell and an end cell at the time of a cold start and improving cold startability and operational efficiency. In particular, another object of the present disclosure is to ensure performance in discharging water by a dummy cell, improve a temperature increase rate at an end cell, and reduce a cold start time.

In order to achieve the above-mentioned objects, a fuel cell stack according to an exemplary embodiment of the present disclosure may include a power generation cell having a first gas diffusion layer, a dummy cell disposed at an end of the power generation cell and including a second gas diffusion layer having higher thermal conductivity than the first gas diffusion layer, an end plate fastened at an end of the dummy cell; and a heater interposed between the dummy cell and the end plate.

The configuration is intended to minimize a difference in temperature increase rate between the central cell and the end cell, which form the power generation cells, at the time of the cold start and improve cold startability and operational efficiency. In other words, in the related art, even though the heater operates to heat the end cell at the time of the cold start, the temperature increase rate at the end cell is less than the temperature increase rate at the central cell since the dummy cell is disposed between the heater and the end cell. As a result, the cold start time for the fuel cell stack is increased.

In contrast, according to the present disclosure, since the second gas diffusion layer of the dummy cell has higher thermal conductivity than the first gas diffusion layer of the power generation cell, a temperature increase rate at a part (e.g., the end cell) of the power generation cell adjacent to the heater may be improved, thereby minimizing a difference in temperature increase rate between the regions of the power generation cells at the time of the cold start and improving cold startability and operational efficiency of the fuel cell stack.

As an example, the second gas diffusion layer has lower porosity than the first gas diffusion layer. As described above, the second gas diffusion layer may have higher thermal conductivity than the first gas diffusion layer as the second gas diffusion layer has lower porosity than the first gas diffusion layer. For reference, effective thermal conductivity of the second gas diffusion layer is obtained by the following Equation 1.

$$k_{eff} = k_{solid}(1-\epsilon) + k_{fluid}\epsilon \qquad \text{Equation 1}$$

wherein, $$k_{solid}\left[\frac{W}{mK}\right]$$

is solid thermal conductivity, $$k_{fluid}\left[\frac{W}{mK}\right]$$

is fluid thermal conductivity, and $\epsilon$ is porosity.

Particularly, the porosity of the second gas diffusion layer is set to 10% to 90% of the porosity of the first gas diffusion layer. In other words, when the porosity of the second gas diffusion layer with respect to the porosity of the first gas diffusion layer is greater than 90% of the porosity of the first gas diffusion layer, it may be difficult to heat the end cell to a sufficient temperature when the cold start is completed since it is impossible to ensure the sufficient thermal conductivity of the second gas diffusion layer.

On the contrary, when the porosity of the second gas diffusion layer with respect to the porosity of the first gas diffusion layer is less than 10% of the porosity of the first gas diffusion layer, structural buffer performance (e.g., structural rigidity) of the second gas diffusion layer deteriorates even though the sufficient thermal conductivity of the second gas diffusion layer may be ensured. Therefore, the porosity of the second gas diffusion layer with respect to the porosity of the first gas diffusion layer may be set to 10% to 90% of the porosity of the first gas diffusion layer. More particularly, the porosity of the second gas diffusion layer is set to about 40% to 60% of the porosity of the first gas diffusion layer.

According to another exemplary embodiment of the present disclosure, the second gas diffusion layer has a smaller thickness than the first gas diffusion layer. As described above, it may be possible to reduce a route of heat transfer through the second gas diffusion layer by decreasing the thickness of the second gas diffusion layer to be less than the thickness of the first gas diffusion layer, thereby obtaining an advantageous effect of improving heat transfer performance of the second gas diffusion layer and increasing the temperature increase rate at the end cell.

Particularly, the thickness of the second gas diffusion layer may be set to 30% to 70% of the thickness of the first gas diffusion layer. In other words, when the thickness of the second gas diffusion layer is greater than 70% of the thickness of the first gas diffusion layer, it may be difficult to heat the end cell to a sufficient temperature when the cold start is completed since it is impossible to sufficiently reduce the route of heat transfer through the second gas diffusion layer.

On the contrary, when the thickness of the second gas diffusion layer is less than 30% of the thickness of the first gas diffusion layer, thermal resistance of the second gas diffusion layer may be increased due to an increase in heat transfer in a land direction perpendicular to direction in which the cells are stacked, and the heat transfer performance may deteriorate. Therefore, the thickness of the second gas diffusion layer may be set to 30% to 70% of the thickness of the first gas diffusion layer. More particularly, the thickness of the second gas diffusion layer may be set to about 40% to 60% of the thickness of the first gas diffusion layer.

In addition, according to another exemplary embodiment of the present disclosure, the dummy cell may include multiple stacked non-power generation cells. As an example, the dummy cell may include a first non-power generation cell; and a second non-power generation cell disposed at an end of the first non-power generation cell. The second gas diffusion layer may include a third gas diffusion layer included in the first non-power generation cell and have lower porosity than the first gas diffusion layer. A fourth gas diffusion layer may be included in the second non-power generation cell and have lower porosity than the third gas diffusion layer.

As described above, the third gas diffusion layer of the first non-power generation cell disposed to be close to the power generation cell has the highest porosity (e.g., a lowest thermal conductivity), and the fourth gas diffusion layer of the second non-power generation cell disposed to be distant from the power generation cell has the relatively lower porosity (e.g., relatively higher thermal conductivity) than the third gas diffusion layer.

As a result, it may be possible to obtain an advantageous effect of improving heat transfer performance of the dummy cell and maximizing structural buffer performance of the power generation cell. According to the present disclosure as described above, it may be possible to obtain an advantageous effect of minimizing a difference in temperature increase rate between the central cell and the end cell at the time of the cold start and improving cold startability and operational efficiency.

In particular, according to the present disclosure, it may be possible to obtain an advantageous effect of ensuring the performance in discharging water by the dummy cell, minimizing the difference in temperature increase rate between the regions of the power generation cells (e.g., the difference between the temperature increase rate at the central cell and the temperature increase rate at the end cell) at the time of the cold start, and improving cold startability and operational efficiency of the fuel cell stack. In addition, according to the present disclosure, it may be possible to obtain an advantageous effect of reducing the output of the heater and reducing costs.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
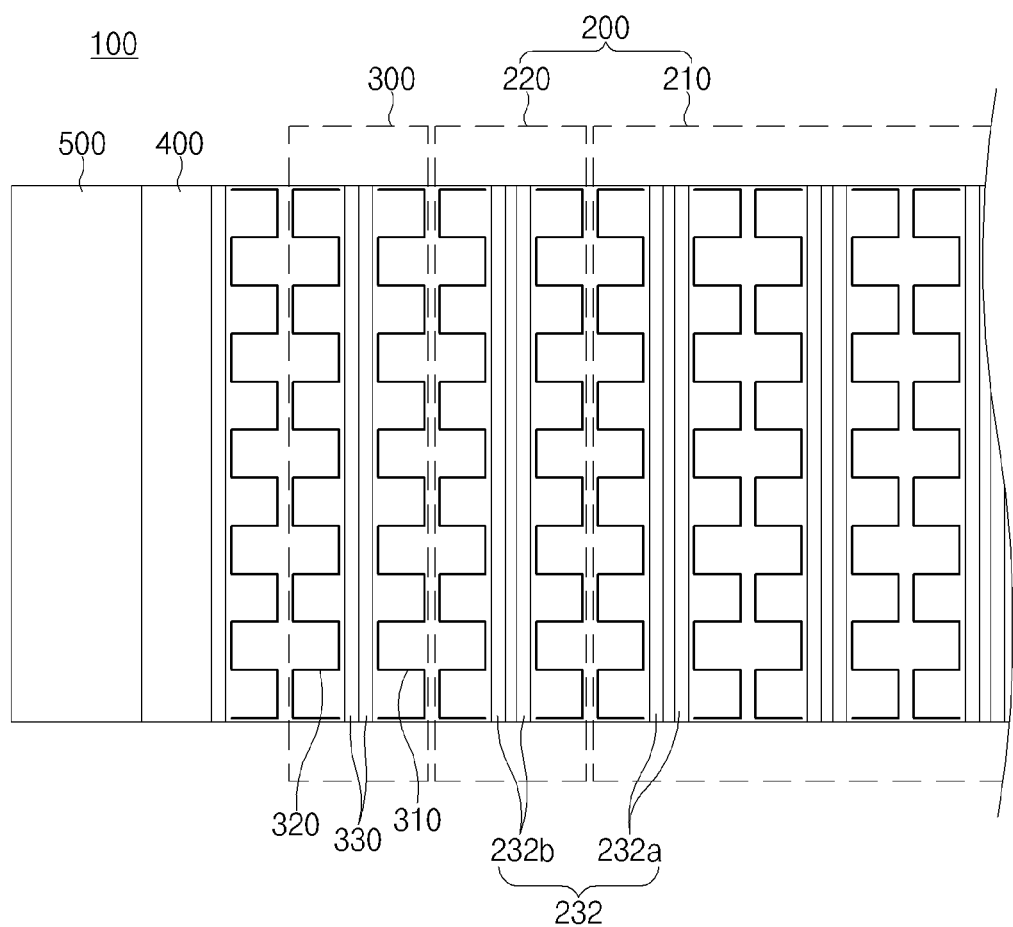
FIG. 1 is a view illustrating a fuel cell stack according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings, but the present disclosure is not restricted or limited by the exemplary embodiments. For reference, like reference numerals denote substantially identical elements in the present description, the description may be made under this rule by incorporating the contents illustrated in other drawings, and the contents repeated or determined as being obvious to those skilled in the art may be omitted.

Referring to FIGS. 1 to 7, a fuel cell stack 100 according to the present disclosure may include power generation cells 200 each having a first gas diffusion layer 232, dummy cells 300 disposed at ends of the power generation cells 200 and each including a second gas diffusion layer 330 having higher thermal conductivity than the first gas diffusion layer 232, end plates fastened to ends of the dummy cells 300, and heaters 400 interposed between the dummy cells 300 and the end plates.

The power generation cell 200 may be configured to generate power, and several tens or hundreds of power generation cells may be stacked in series. More specifically, the power generation cells 200 may include central cells 210, and end cells 220 disposed at both ends of the central cells 210 in a direction in which the central cells 210 are stacked.

As an example, each of the central cells 210 and the end cells 220, forming the power generation cells 200, may include a membrane electrode assembly (MEA) (not illustrated), and an anode side separator (not illustrated) and a cathode side separator (not illustrated) stacked at both sides of the membrane electrode assembly and having reactant gas flow paths. A first gas diffusion layer 232 may be disposed between the membrane electrode assembly and each of the separators such that the first gas diffusion layer 232 is in close contact (e.g., abutting contact) with the membrane electrode assembly and each of the separators.

The first gas diffusion layer 232 may be positioned between the membrane electrode assembly and the separator (or bipolar plate) and may physically support a catalyst layer, deliver a fluid, which is introduced into the fuel cell through the flow path of the separator, to the catalyst layer, diffuse a fluid produced by a chemical reaction to allow the fluid to flow to the flow path of the separator, and deliver electrons, which are produced by an electrochemical reaction, to the separator.

As an example, the first gas diffusion layers 232 may include a first gas diffusion layer 232a for the central cell and a first gas diffusion layer 232b for the end cell. Further, the first gas diffusion layer 232 may be made of a porous substance. In addition, the first gas diffusion layer 232 may be partially or entirely impregnated with polytetrafluoroethylene (PTFE) to prevent moisture contained in a reactant gas from clogging pores. The dummy cells 300 may be disposed at both ends of the power generation cells 200 (e.g., both ends in the direction in which the power generation cells are stacked) to effectively discharge water from the fuel cell stack 100.

For example, during a process of circulating water in the fuel cell stack 100, condensate water or the like, flowing through a humidifier→a common distributor→the end plate→a stack (separator) manifold, may be introduced into a cathode inlet side of the power generation cell 200, and condensate water, flowing through a FPS→the common distributor→the end plate→the stack (separator) manifold, and water, which flows from the cathode to the membrane electrode assembly, may be introduced into an anode inlet side of the power generation cell 200.

The water, introduced into the cathode inlet side or the anode inlet side as described above, flows into outermost peripheral cells abutting the end plates 500, which may cause a rapid decrease and increase in cell voltages and may result in degradation of membrane electrode assembly catalysts caused by a large amount of water existing in the cells. Therefore, the dummy cell 300 may be disposed between the power generation cell 200 and the end plate 500 to effectively discharge the condensate water (water) from the stack.

Unlike the power generation cell 200, the dummy cell 300 is not configured to generate power and thus does not have the membrane electrode assembly or the electrolyte membrane. More specifically, the dummy cell 300 does not include the membrane electrode assembly, but includes a first separator (e.g., an anode separator) 310, a second separator (e.g., a cathode separator) 320, and second gas diffusion layers 330 (e.g., a second gas diffusion layer for the anode and a second gas diffusion layer for the cathode) interposed between the first separator 310 and the second separator 320.

For reference, the power generation cells 200 and the dummy cells 300 may be fastened by end plates 500 coupled at outer sides of the dummy cells 300. In other words, the end plates 500 may be installed at both outermost peripheral ends of the power generation cells 200 and the dummy cells 300 stacked one on another. In addition, the heater 400 may be interposed between the dummy cell 300 and the end plate so that the heater 400 abuts the dummy cell 300 and the end plate, and the heater 400 may be configured to heat the end cell 220 at the time of a cold start. In other words, when the heater 400 is turned on, the heat from the heater 400 may be transferred to the end cell 220 through the dummy cell 300 to heat the end cell 220. A typical plate-shaped heater 400 may be used as the heater 400, but the present disclosure is not restricted or limited by the type and the structure of the heater 400.

Figure 2:
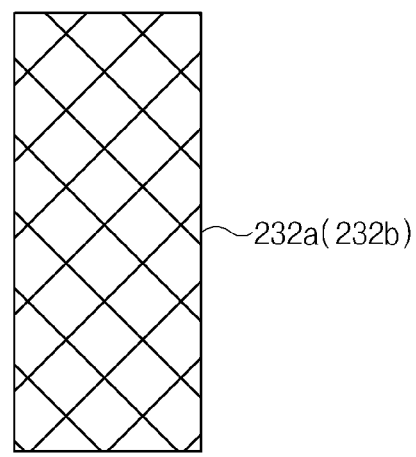
FIG. 2 is a view illustrating a first gas diffusion layer in the fuel cell stack according to an exemplary embodiment of the present disclosure.
Figure 3:
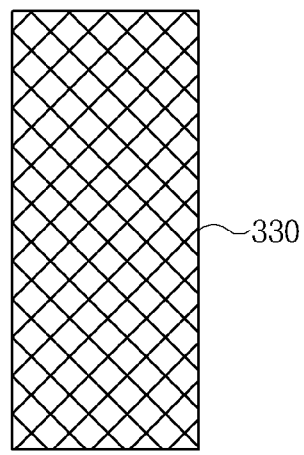
FIG. 3 is a view illustrating a second gas diffusion layer in the fuel cell stack according to an exemplary embodiment of the present disclosure.

Referring to FIGS. 2 and 3, the second gas diffusion layer 330 of the dummy cell 300 has higher thermal conductivity than the first gas diffusion layer 232. The configuration is intended to minimize a difference in temperature increase rate between the central cell 210 and the end cell 220, which form the power generation cells 200, at the time of the cold start and improve cold startability and operational efficiency. In other words, in the related art, even though the heater operates to heat the end cell at the time of the cold start, the temperature increase rate at the end cell is less than the temperature increase rate at the central cell since the dummy cell is disposed between the heater and the end cell. As a result, the cold start time for the fuel cell stack is increased.

In contrast, according to the present disclosure, since the second gas diffusion layer 330, which forms the dummy cell 300, has higher thermal conductivity than the first gas diffusion layer 232 of the power generation cell 200, a temperature increase rate at a part (e.g., the end cell) of the power generation cell 200 adjacent to the heater 400 may be improved, thereby obtaining an advantageous effect of minimizing a difference in temperature increase rate between the regions of the power generation cells 200 at the time of the cold start and improving cold startability and operational efficiency of the fuel cell stack 100.

The second gas diffusion layer 330, which has higher thermal conductivity than the first gas diffusion layer 232, may be provided by various methods based on required conditions and design specifications. As an example, the second gas diffusion layer 330 may have higher thermal conductivity than the first gas diffusion layer 232 as the second gas diffusion layer 330 has lower porosity than the first gas diffusion layer 232. As described above, when the second gas diffusion layer 330 has high thermal conductivity, the heat from the heater 400 may be more effectively transferred to the end cell 220 to thus increase the temperature increase rate at the end cell 220.

For reference, effective thermal conductivity of the second gas diffusion layer 330 may be obtained by the following Equation 1.

$$k_{eff} = k_{solid}(1-\epsilon) + k_{fluid}\epsilon \qquad \text{Equation 1}$$

wherein, $$k_{solid}\left[\frac{W}{mK}\right]$$

is solid thermal conductivity, $$k_{fluid}\left[\frac{W}{mK}\right]$$

is fluid thermal conductivity, and ∈ is porosity. (Here, Solid Thermal Conductivity>Fluid (Gas) Thermal Conductivity)

Figure 4:
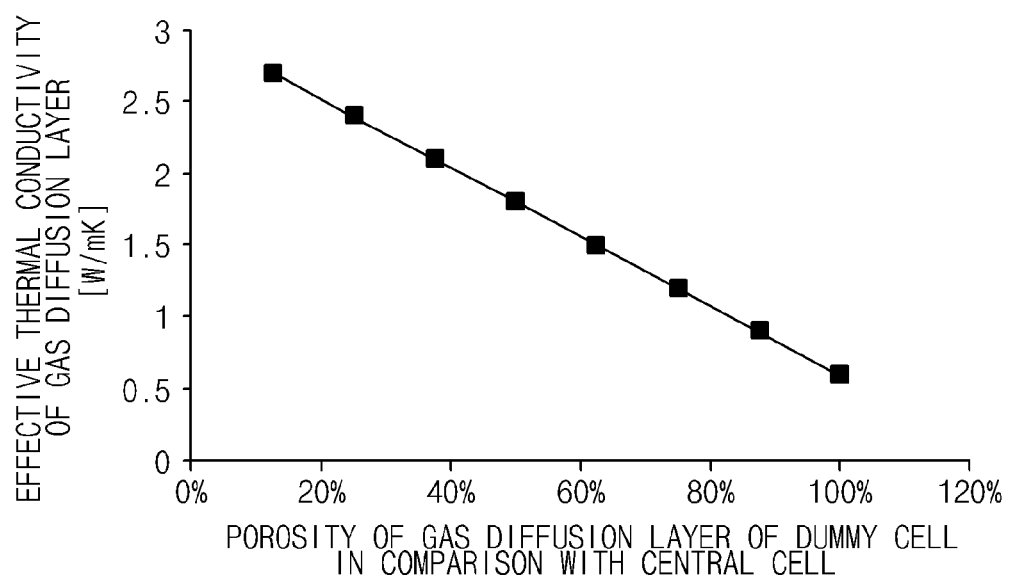
FIG. 4 is a view illustrating thermal conductivity with respect to porosity of the second gas diffusion layer in the fuel cell stack according to an exemplary embodiment of the present disclosure.
Figure 6:
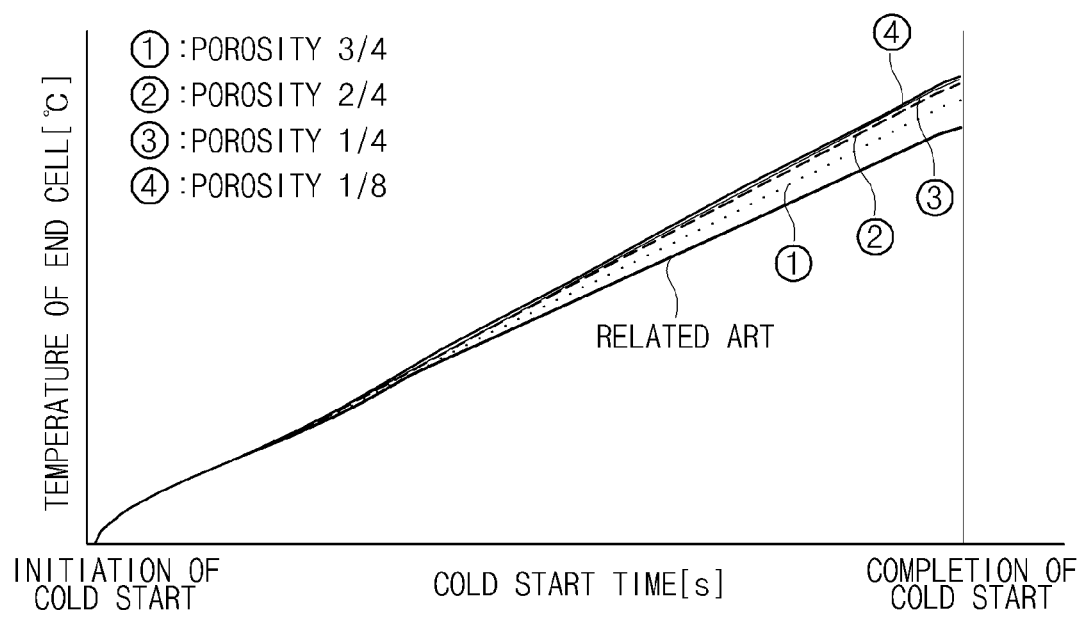
FIG. 6 is a view illustrating a temperature of an end cell with respect to porosity of the second gas diffusion layer in the fuel cell stack according to an exemplary embodiment of the present disclosure.
Figure 7:
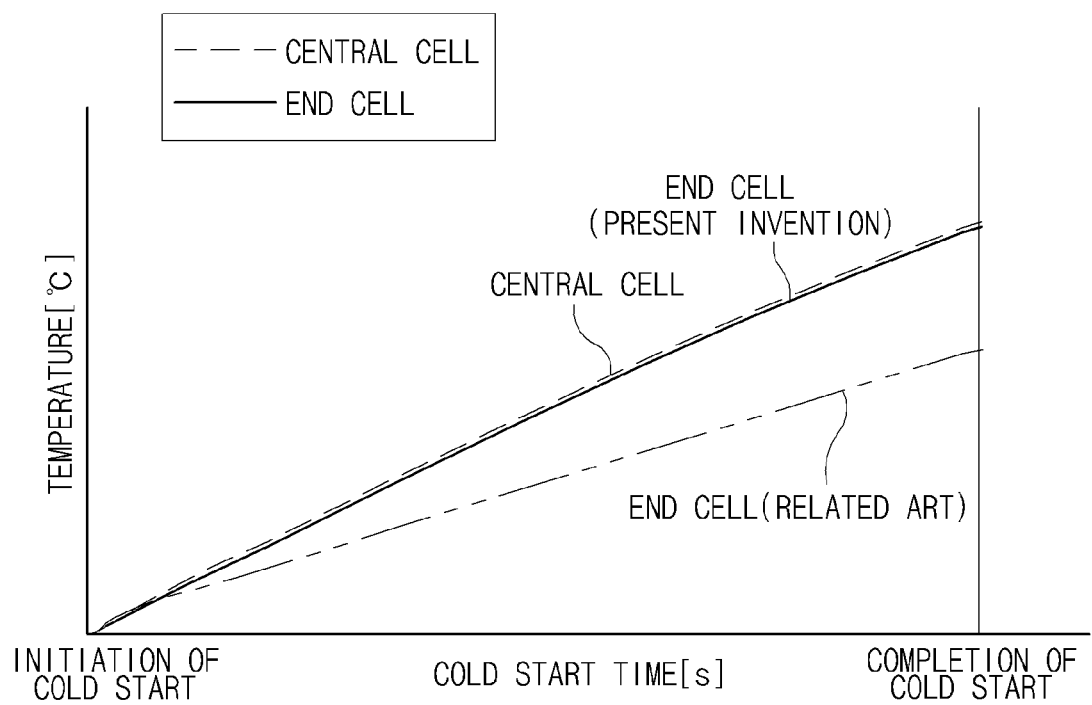
FIG. 7 is a view illustrating a temperature of the end cell with respect to an on/off state of a heater in the fuel cell stack according to an exemplary embodiment of the present disclosure.

In addition, referring to FIG. 4, the effective thermal conductivity of the second gas diffusion layer 330 increases as the porosity of the second gas diffusion layer 330 decreases (e.g., the porosity of the second gas diffusion layer becomes lower than the porosity of the first gas diffusion layer). Therefore, as illustrated in FIG. 6, the temperature of the end cell 220 increases as the porosity of the second gas diffusion layer 330 becomes lower than the porosity of the first gas diffusion layer 232.

For reference, in the present disclosure, the configuration in which the porosity of the second gas diffusion layer 330 is lower than the porosity of the first gas diffusion layer 232 refers to that a distribution of the pores in the second gas diffusion layer 330 is smaller than a distribution of the pores of the first gas diffusion layer 232 when the area and the pore size remain the same, or the size of the pore in the second gas diffusion layer 330 is smaller than the size of the pore in first gas diffusion layer 232 when the area and the distribution of the pores remain the same.

Figure 5:
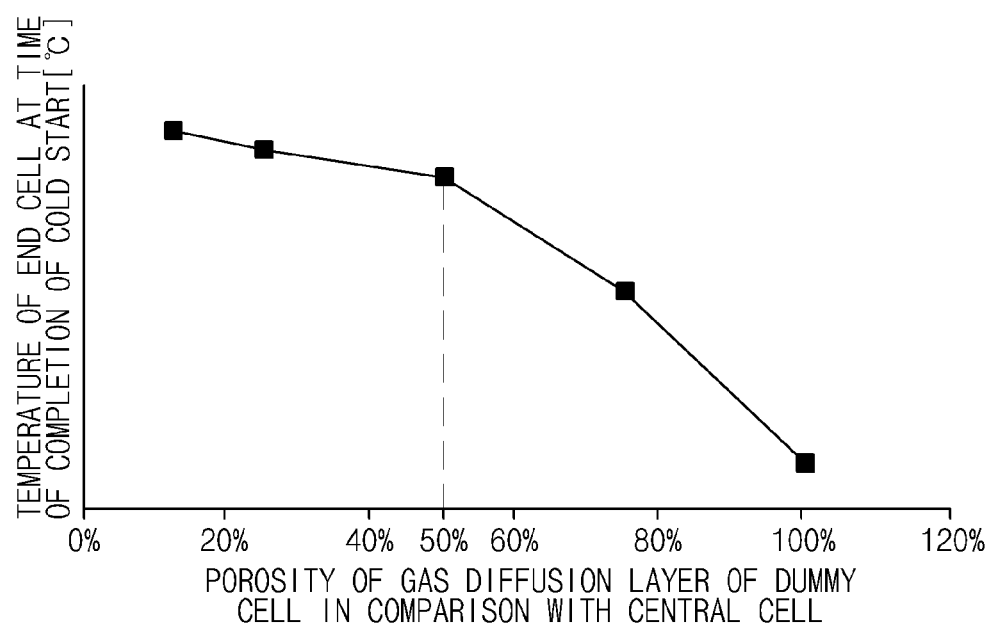
FIG. 5 is a view illustrating a temperature at the time of completion of a cold start with respect to porosity of the second gas diffusion layer in the fuel cell stack according to an exemplary embodiment of the present disclosure.

Particularly, referring to FIG. 5, the porosity of the second gas diffusion layer 330 may be set to 10% to 90% of the porosity of the first gas diffusion layer 232, thereby obtaining an advantageous effect of maintaining buffer performance of the second gas diffusion layer 330 and improving the temperature rising rate at the end cell 220 by the heater 400 at the time of the cold start.

In other words, if the porosity of the second gas diffusion layer 330 with respect to the porosity of the first gas diffusion layer 232 is greater than 90% of the porosity of the first gas diffusion layer 232, it is difficult to heat the end cell 220 to a sufficient temperature when the cold start is completed since it is impossible to ensure the sufficient thermal conductivity of the second gas diffusion layer 330. On the contrary, if the porosity of the second gas diffusion layer 330 with respect to the porosity of the first gas diffusion layer 232 is less than 10% of the porosity of the first gas diffusion layer 232, structural buffer performance (e.g., structural rigidity) of the second gas diffusion layer 330 deteriorates even though the sufficient thermal conductivity of the second gas diffusion layer 330 may be ensured. Therefore, the porosity of the second gas diffusion layer 330 with respect to the porosity of the first gas diffusion layer 232 may be set to 10% to 90% of the porosity of the first gas diffusion layer 232.

Particularly, the porosity of the second gas diffusion layer 330 may be set to 40% to 60% of the porosity of the first gas diffusion layer 232. More particularly, the porosity of the second gas diffusion layer 330 may be set to about 50% of the porosity of the first gas diffusion layer 232. This configuration is based on the fact that the temperature increase rate of the end cell 220 is rapidly changed when the porosity of the second gas diffusion layer 330 is 50% of the porosity of the first gas diffusion layer 232, as illustrated in FIG. 5. As a result, when the porosity of the second gas diffusion layer 330 is set to 50% of the porosity of the first gas diffusion layer 232, it may be possible to obtain an advantageous effect of maximizing the temperature increase rate at the end cell 220 and reducing the time required to increase the temperature of the end cell 220.

For example, when the porosity of the first gas diffusion layer 232 is 90% and the porosity of the second gas diffusion layer 330 is 50% of the porosity of the first gas diffusion layer 232, the porosity of the second gas diffusion layer 330 may be about 45% (90%/2=45%). As described above, as illustrated in FIG. 7, the porosity of the second gas diffusion layer 330 is less than the porosity of the first gas diffusion layer 232, and thus, the temperature increase rate at the end cell 220 at the time of the cold start may be increased, thereby obtaining an advantageous effect of minimizing a difference in temperature increase rate between the end cell 220 and the central cell 210.

Figure 8:
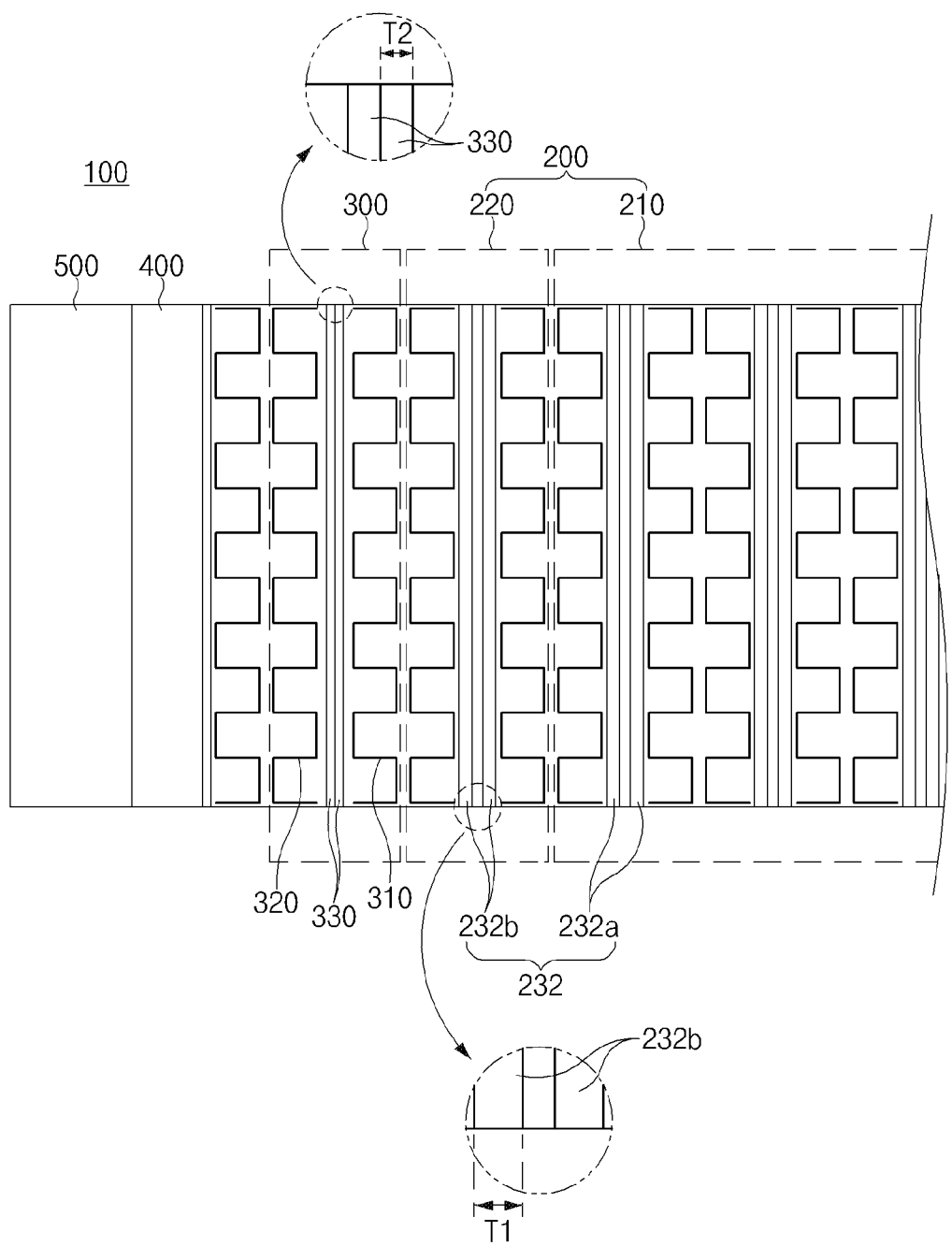
FIG. 8 is a view illustrating another exemplary embodiment of the second gas diffusion layer in the fuel cell stack according to an exemplary embodiment of the present disclosure.
Figure 9:
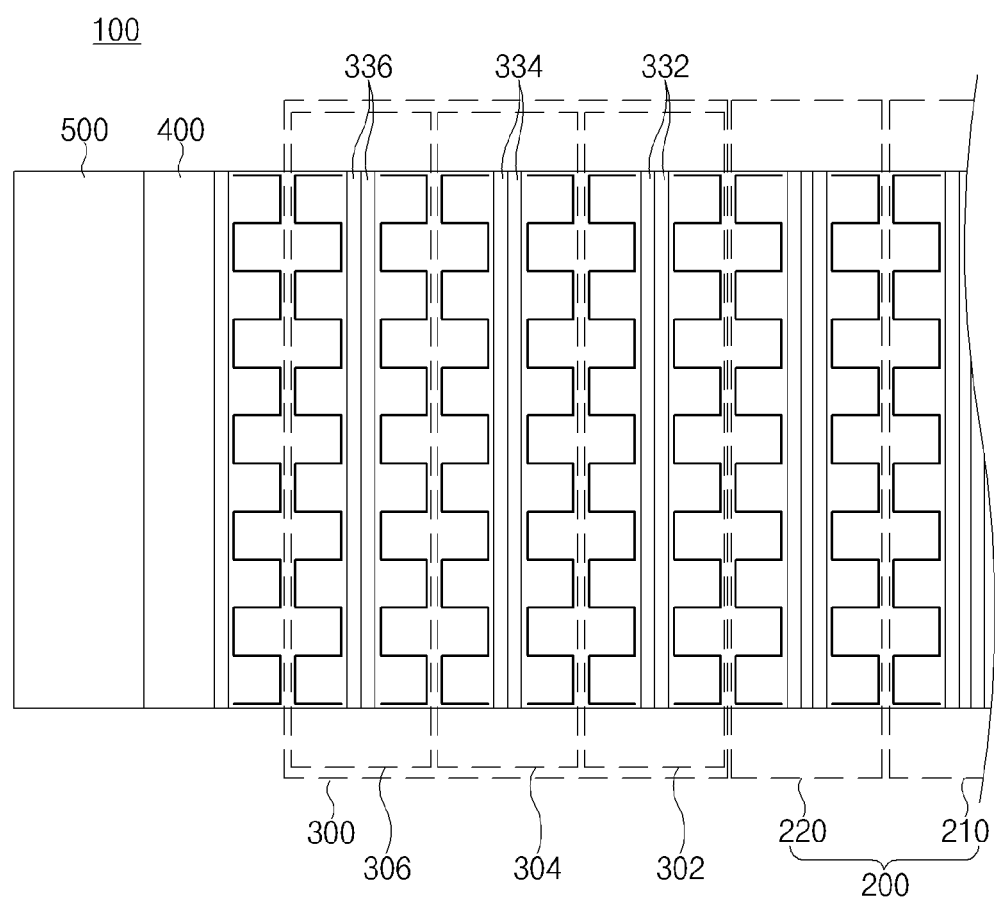
FIG. 9 is a view illustrating another exemplary embodiment of a dummy cell in the fuel cell stack according to an exemplary embodiment of the present disclosure.

Meanwhile, FIG. 8 is a view illustrating another exemplary embodiment of the second gas diffusion layer in the fuel cell stack according to the present disclosure, and FIG. 9 is a view illustrating another exemplary embodiment of a dummy cell in the fuel cell stack according to the present disclosure. Further, the parts identical and corresponding to the parts in the above-mentioned configuration will be designated by the identical or corresponding reference numerals, and detailed descriptions thereof will be omitted.

In the exemplary embodiment of the present disclosure described and illustrated above, the example in which the thermal conductivity of the second gas diffusion layer is adjusted by setting the porosity of the second gas diffusion layer lower than the porosity of the first gas diffusion layer is described. However, according to another exemplary embodiment of the present disclosure, it may be possible to adjust the thermal conductivity of the second gas diffusion layer 330 by adjusting a thickness T2 of the second gas diffusion layer 330 to be smaller than a thickness of the first gas diffusion layer 232.

Referring to FIG. 8, the second gas diffusion layer 330 has a smaller thickness than the first gas diffusion layer 232 (T2<T1). As described above, it may be possible to reduce a route of heat transfer through the second gas diffusion layer 330 by forming the thickness of the second gas diffusion layer 330 to be smaller than the thickness of the first gas diffusion layer 232, thereby obtaining an advantageous effect of improving heat transfer performance of the second gas diffusion layer 330 and increasing the temperature increase rate at the end cell 220.

Particularly, the thickness T2 of the second gas diffusion layer 330 may be set to about 30% to 70% of the thickness T1 of the first gas diffusion layer 232. In other words, if the thickness T2 of the second gas diffusion layer 330 is greater than 70% of the thickness T1 of the first gas diffusion layer 232, it may be difficult to heat the end cell 220 to a sufficient temperature when the cold start is completed since it is impossible to sufficiently reduce the route of heat transfer through the second gas diffusion layer 330.

On the contrary, if the thickness T2 of the second gas diffusion layer 330 is less than about 30% of the thickness T1 of the first gas diffusion layer 232, thermal resistance of the second gas diffusion layer 330 is increased due to an increase in heat transfer in a vertical direction based on FIG. 1 (e.g., a direction perpendicular to direction in which the cells are stacked), and the heat transfer performance may deteriorate. Therefore, the thickness T2 of the second gas diffusion layer 330 may be set to about 30% to 70% of the thickness T1 of the first gas diffusion layer 232.

Particularly, the thickness T2 of the second gas diffusion layer 330 may be set to about 40% to 60% of the thickness T1 of the first gas diffusion layer 232. More particularly, the thickness T2 of the second gas diffusion layer 330 may be set to about 50% of the thickness T1 of the first gas diffusion layer 232. In addition, according to another exemplary embodiment of the present disclosure, the dummy cell 300 may include multiple non-power generation cells 302, 304, and 306 stacked one on another.

Referring to FIG. 9, the dummy cell 300 disposed at the outer periphery of the power generation cell 200 may include the multiple non-power generation cells 302, 304, and 306 stacked one on another. Hereinafter, an example in which the dummy cell 300 includes a first non-power generation cell 302, a second non-power generation cell 304, and a third non-power generation cell 306 are stacked one on another will be described. In some instances, the dummy cell may include two non-power generation cells or four or more non-power generation cells.

Referring back to FIG. 9, the dummy cell 300 may include the first non-power generation cell 302, the second non-power generation cell 304 disposed at an end of the first non-power generation cell 302, and the third non-power generation cell 306 disposed at an end of the second non-power generation cell 304. The second gas diffusion layer 330 may include a third gas diffusion layer 332 included in the first non-power generation cell 302 and having lower porosity than the first gas diffusion layer 232, a fourth gas diffusion layer 334 included in the second non-power generation cell 304 and having lower porosity than the third gas diffusion layer 332, and a third of second gas diffusion layer 336 included in the third non-power generation cell 306 and having lower porosity than the fourth gas diffusion layer 334.

As described above, the third gas diffusion layer 332 of the first non-power generation cell 302 disposed to abut the power generation cell 200 has a highest porosity (e.g., a lowest thermal conductivity), and the third of second gas diffusion layer 336 of the third non-power generation cell 306 disposed to be distant from the power generation cell 200 has a lowest porosity (e.g., highest thermal conductivity). As a result, it may be possible to obtain an advantageous effect of improving heat transfer performance of the dummy cell 300 and maximizing structural buffer performance of the dummy cell 300.

While the present disclosure has been described above with reference to the exemplary embodiments, it may be understood by those skilled in the art that the present disclosure may be variously modified and changed without departing from the spirit and scope of the present disclosure disclosed in the claims.

What is claimed is:
1. A fuel cell stack, comprising:
   a power generation cell including a first gas diffusion layer;
   a dummy cell disposed at an end of the power generation cell and including a second gas diffusion layer having higher thermal conductivity than the first gas diffusion layer;
   an end plate fastened at an end of the dummy cell; and
   a heater interposed between the dummy cell and the end plate.
2. The fuel cell stack of claim 1, wherein the second gas diffusion layer has lower porosity than the first gas diffusion layer.

3. The fuel cell stack of claim 2, wherein the porosity of the second gas diffusion layer is 10% to 90% of the porosity of the first gas diffusion layer.

4. The fuel cell stack of claim 3, wherein the porosity of the second gas diffusion layer is 40% to 60% of the porosity of the first gas diffusion layer.

5. The fuel cell stack of claim 1, wherein the thermal conductivity of the second gas diffusion layer is obtained by the following Equation, $$k_{eff} = k_{solid}(1-\in) + k_{fluid}\in$$

wherein, $$k_{solid}\left[\frac{W}{mK}\right]$$

is solid thermal conductivity of the second gas diffusion layer, $$k_{fluid}\left[\frac{W}{mK}\right]$$

is fluid thermal conductivity of the second gas diffusion layer, and $\in$ is porosity.

6. The fuel cell stack of claim 2, wherein the dummy cell includes a plurality of stacked non-power generation cells.

7. The fuel cell stack of claim 6, wherein the dummy cell includes:

a first non-power generation cell; and a second non-power generation cell disposed at an end of the first non-power generation cell, and wherein the second gas diffusion layer includes:

a third gas diffusion layer included in the first non-power generation cell and having lower porosity than the first gas diffusion layer; and a fourth gas diffusion layer included in the second non-power generation cell and having lower porosity than the third gas diffusion layer.

8. The fuel cell stack of claim 1, wherein the power generation cells include:

a central cell; and an end cell disposed at an end of the central cell, and the dummy cell is disposed between the end cell and the heater.

9. The fuel cell stack of claim 8, wherein the second gas diffusion layer of the dummy cell has higher thermal conductivity than the first gas diffusion layer positioned on the power generation cell.

10. The fuel cell stack of claim 1, wherein the second gas diffusion layer has a smaller thickness than the first gas diffusion layer.

11. The fuel cell stack of claim 1, wherein a thickness of the second gas diffusion layer is 30% to 70% of a thickness of the first gas diffusion layer.

12. The fuel cell stack of claim 11, wherein a thickness of the second gas diffusion layer is 40% to 60% of a thickness of the first gas diffusion layer.

* * * * *